(12) United States Patent
Ouyang

(10) Patent No.: US 9,362,824 B2
(45) Date of Patent: Jun. 7, 2016

(54) CONSTANT ON-TIME CONTROL SWITCHING CONVERTER WITH DC CALIBRATION AND CONTROL CIRCUIT AND METHOD THEREOF

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/479,052

(22) Filed: Sep. 5, 2014

(65) Prior Publication Data

US 2015/0069982 A1    Mar. 12, 2015

(30) Foreign Application Priority Data

Sep. 6, 2013    (CN) .......................... 2013 1 0401805

(51) Int. Cl.
*H02M 3/156* (2006.01)
*H02M 3/158* (2006.01)
*H02M 1/00* (2006.01)
*G05F 1/595* (2006.01)

(52) U.S. Cl.
CPC .............. *H02M 3/156* (2013.01); *G05F 1/595* (2013.01); *H02M 3/158* (2013.01); *H02M 2001/0025* (2013.01)

(58) Field of Classification Search
CPC ..................... H02M 2001/0025; H02M 3/156; H02M 3/158; G05F 1/595
See application file for complete search history.

(56) References Cited

U.S. PATENT DOCUMENTS

| 5,382,918 | A * | 1/1995 | Yamatake | H03H 11/48 330/260 |
|---|---|---|---|---|
| 7,294,994 | B2 * | 11/2007 | Ryu | H02M 1/08 323/282 |
| 8,198,880 | B2 | 6/2012 | Ouyang | |
| 8,400,129 | B2 | 3/2013 | Ouyang | |
| 8,686,703 | B2 | 4/2014 | Xi | |
| 8,717,002 | B2 | 5/2014 | Xi | |
| 8,749,216 | B2 | 6/2014 | Li et al. | |
| 2005/0231181 | A1 * | 10/2005 | Bernacchia | H02M 3/156 323/274 |
| 2007/0222423 | A1 * | 9/2007 | Chen | H02M 3/156 323/283 |
| 2011/0273156 | A1 * | 11/2011 | Miyamae | H02M 3/156 323/288 |
| 2012/0139507 | A1 * | 6/2012 | Ferguson | H02M 3/158 323/234 |
| 2012/0235652 | A1 | 9/2012 | Sheng et al. | |
| 2012/0235664 | A1 | 9/2012 | Dong et al. | |
| 2012/0274293 | A1 | 11/2012 | Ren et al. | |
| 2013/0002221 | A1 | 1/2013 | Wang et al. | |
| 2013/0038301 | A1 | 2/2013 | Ouyang et al. | |
| 2013/0038302 | A1 | 2/2013 | Qian et al. | |
| 2013/0141069 | A1 | 6/2013 | Li | |
| 2013/0147454 | A1 | 6/2013 | Wang | |
| 2013/0257399 | A1 | 10/2013 | Jiang et al. | |
| 2013/0335052 | A1 * | 12/2013 | Li | G05F 1/618 323/285 |
| 2014/0022684 | A1 | 1/2014 | Jiang et al. | |
| 2014/0035654 | A1 | 2/2014 | Jiang et al. | |
| 2014/0049235 | A1 | 2/2014 | Li et al. | |

* cited by examiner

*Primary Examiner* — Jue Zhang
*Assistant Examiner* — Lakaisha Jackson
(74) *Attorney, Agent, or Firm* — Perkins Coie LLP

(57) ABSTRACT

A constant on-time control switching converter with DC calibration is disclosed. A current flowing into a capacitor of a DC calibration circuit is reduced by introducing a transconductance amplifier and a resistor. Thus, the equivalent capacitance of the capacitor is magnified, which allows the user to integrate a capacitor with smaller capacitance to realize DC calibration.

6 Claims, 3 Drawing Sheets

CONSTANT ON-TIME CONTROL SWITCHING CONVERTER WITH DC CALIBRATION AND CONTROL CIRCUIT AND METHOD THEREOF

CROSS-REFERENCE TO RELATED APPLICATION(S)

This application claims the benefit of CN application 201310401805.2, filed on Sep. 6, 2013, and incorporated herein by reference.

TECHNICAL FIELD

The present invention relates generally to electronic circuits, and more particularly but not exclusively to switching converters and control circuits and methods thereof.

BACKGROUND

In switching converters with COT (constant on-time) control, DC calibration circuits are usually used to improve the line regulation and the load regulation.

The prior DC calibration circuits usually comprise a transconductance amplifier and a capacitor. The transconductance amplifier receives a reference voltage and a sample signal and generates an error current based on the reference voltage and the sample signal. The error current flows through the capacitor and generates a calibrated reference voltage across the capacitor. In the prior DC calibration circuits, the capacitance of the capacitor should be large enough to prevent the DC calibration circuit from saturating at light load. For example, the capacitance may be 22 nF. However, a capacitor with such large capacitance is hard to fabricate in an integrated circuit. Therefore, a dedicated pin is usually needed for connection to an external capacitor. However, the more pins the integrated circuit has, the higher the cost is.

SUMMARY present invention are directed to a control circuit of a switching converter. The switching converter has a switching circuit providing an output voltage. The control circuit has a DC calibration circuit, a comparison circuit, an on-time control circuit and a logic circuit. The DC calibration circuit has a first input terminal, a second input terminal and an output terminal. The first input terminal and the second input terminal are configured to respectively receive a reference voltage and a sample signal, and the DC calibration circuit generates a calibrated reference voltage at the output terminal based on the reference voltage and the sample signal representative of the output voltage. The DC calibration circuit comprises a first amplifier, a second amplifier, a first resistor and a capacitor. The first amplifier has a first input terminal, a second input terminal and an output terminal. The first input terminal and the second input terminal are configured to respectively receive the reference voltage and the sample signal, and the first amplifier amplifies the difference between the reference voltage and the sample signal and generates an error current at the output terminal. The second amplifier has a first input terminal, a second input terminal and an output terminal. The first input terminal is electrically coupled to the output terminal of the first amplifier to receive the error current, and the output terminal is electrically coupled to the first input terminal of the second amplifier and the output terminal of the DC calibration circuit. The first resistor is electrically coupled between the first input terminal and the second input terminal of the second amplifier. The capacitor is electrically coupled between the second input terminal of the second amplifier and a reference ground. The comparison circuit is electrically coupled to the DC calibration circuit. The comparison circuit compares the sample signal with the calibrated reference voltage and generates a comparison signal. The on-time control circuit is configured to generate an on-time control signal. The logic circuit is electrically coupled to the comparison circuit and the on-time control circuit. Based on the on-time control signal and the comparison signal, the logic circuit generates a control signal to control the switching circuit.

Embodiments of the present invention are also directed to a switching converter. The switching converter has a DC calibration circuit, a comparison circuit, an on-time control circuit, a logic circuit and a switching circuit providing an output voltage. The DC calibration circuit has a first input terminal, a second input terminal and an output terminal. The first input terminal and the second input terminal are configured to respectively receive a reference voltage and a sample signal representative of the output voltage, and the DC calibration circuit generates a calibrated reference voltage at the output terminal based on the reference voltage and the sample signal. The DC calibration circuit has a first amplifier, a second amplifier, a first resistor and a capacitor. The first amplifier has a first input terminal, a second input terminal and an output terminal. The first input terminal and the second input terminal are configured to respectively receive the reference voltage and the sample signal, and the first amplifier amplifies the difference between the reference voltage and the sample signal and generates an error current at the output terminal. The second amplifier has a first input terminal, a second input terminal and an output terminal. The first input terminal is electrically coupled to the output terminal of the first amplifier to receive the error current, and the output terminal is electrically coupled to the first input terminal of the second amplifier and the output terminal of the DC calibration circuit. The first resistor is electrically coupled between the first input terminal and the second input terminal of the second amplifier. The capacitor is electrically coupled between the second input terminal of the second amplifier and a reference ground. The comparison circuit is electrically coupled to the DC calibration circuit. The comparison circuit compares the sample signal with the calibrated reference voltage and generates a comparison signal. The on-time control circuit is configured to generate an on-time control signal. The logic circuit is electrically coupled to the comparison circuit and the on-time control circuit. Based on the on-time control signal and the comparison signal, the logic circuit generates a control signal to control the switching circuit. The switching circuit is configured to receive an input voltage and the control signal. The switching circuit converts the input voltage into an output voltage based on the control signal.

Embodiments of the present invention are further directed to a control method for controlling a switching converter. The switching converter has a switch and is configured to provide an output voltage. The control method has the following steps: amplifying the difference between a reference voltage and a sample signal representative of the output voltage and generating an error current based thereupon; providing a portion of the error current to a capacitor to generate a voltage across the capacitor; comparing the voltage across the capacitor with the sample signal and generating a comparison signal; providing an on-time control signal to control the on-time of a switch; and generating a control signal based on the on-time control signal and the comparison signal to control the switch.

BRIEF DESCRIPTION OF THE DRAWINGS

The present invention can be further understood with reference to the following detailed description and the appended drawings, wherein like elements are provided with like reference numerals.

DETAILED DESCRIPTION

Figure 1:
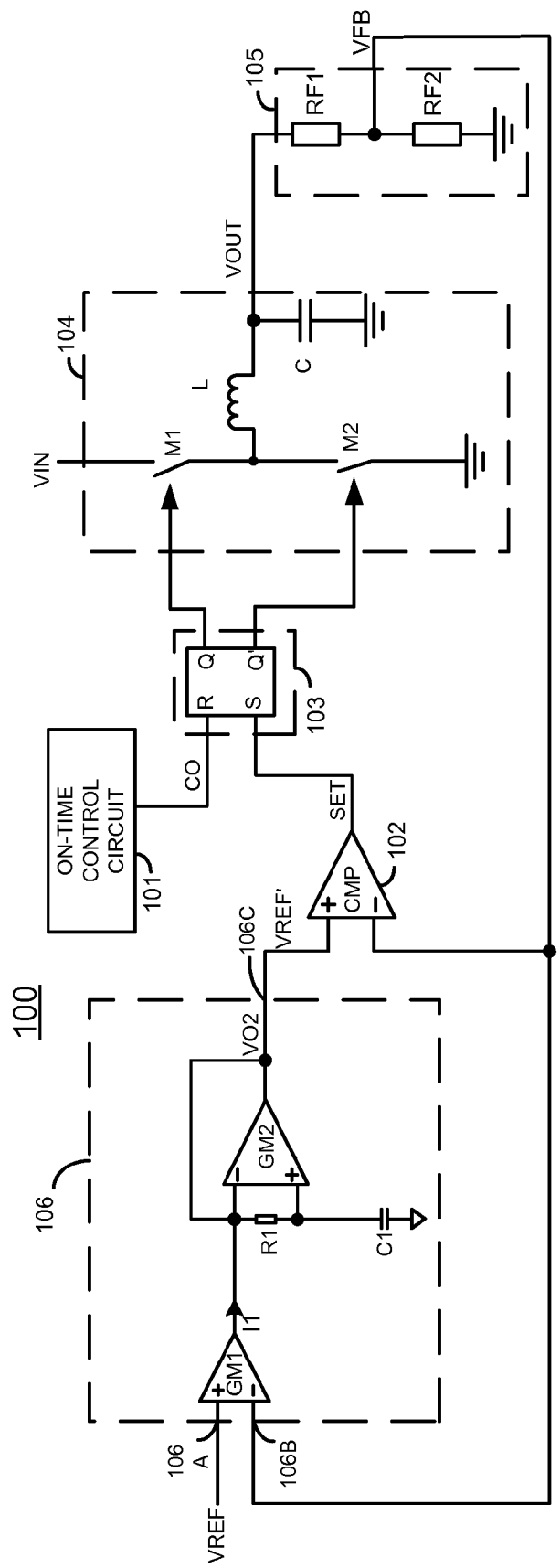
FIG. 1 schematically illustrates a COT converter 100 in accordance with an embodiment of the present invention.

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references.

FIG. 1 schematically illustrates a COT converter 100 in accordance with an embodiment of the present invention. As shown in FIG. 1, the COT converter 100 comprises a control circuit, a switching circuit 104 and a feedback circuit 105. The switching circuit 104 employs synchronous buck topology and comprises switches M1 and M2, an inductor L and an output capacitor C.

The switching circuit 104 is configured to receive an input voltage VIN and to further convert the input voltage VIN into an output voltage VOUT. The switch M1 has a first terminal, a second terminal and a control terminal, wherein the first terminal is configured to receive the input voltage VIN. The switch M2 has a first terminal, a second terminal and a control terminal, wherein the first terminal is electrically coupled to the second terminal of the switch M1, and the second terminal is grounded. The inductor L has a first terminal and a second terminal, wherein the first terminal is electrically coupled to the second terminal of the switch M1 and the first terminal of the switch M2. The output capacitor C is electrically coupled between the second terminal of the inductor L and a reference ground, and a voltage across the output capacitor C is provided as the output voltage VOUT of the switching circuit 104.

The feedback circuit 105 is electrically coupled to the switching circuit 104 to receive the output voltage VOUT and is configured to generate a feedback signal VFB based thereupon. In an embodiment, the feedback circuit 105 comprises a voltage divider consisting of resistors RF1 and RF2 which are connected in series. In another embodiment, the feedback circuit 105 may be omitted, and the output voltage VOUT is fed into the control circuit instead of the feedback signal VFB. The feedback signal VFB and the output voltage VOUT may be referred to as a sample signal in general.

The control circuit comprises an on-time control circuit 101, a comparison circuit 102, a logic circuit 103 and a DC calibration circuit 106. The DC calibration circuit 106 has a first input terminal 106A, a second input terminal 106B and an output terminal 106C. The DC calibration circuit 106 comprises transconductance amplifiers GM1 and GM2, a capacitor C1 and a resistor R1. The transconductance amplifier GM1 has a non-inverting input terminal, an inverting input terminal and an output terminal, wherein the non-inverting input terminal is configured as the first input terminal 106A of the DC calibration circuit 106 to receive a reference voltage VREF, the inverting input terminal which is configured as the second input terminal 106B of the DC calibration circuit 106 is electrically coupled to the feedback circuit 105 to receive the feedback signal VFB. The transconductance amplifier GM1 amplifies the difference between the reference voltage VREF and the feedback signal VFB and generates an error current 11 at the output terminal. The transconductance amplifier GM2 has a non-inverting input terminal, an inverting input terminal and an output terminal, wherein the inverting input terminal is electrically coupled to the output terminal of the transconductance amplifier GM1 to receive the error current 11, the output terminal is electrically coupled to the inverting input terminal of the second transconductance amplifier GM2 and the output terminal 106C of the DC calibration circuit 106. The resistor R1 is electrically coupled between the non-inverting input terminal and the inverting input terminal of the transconductance amplifier GM2. The capacitor C1 is electrically coupled between the non-inverting input terminal of the transconductance amplifier GM2 and the reference ground. In the embodiment illustrated in FIG. 1, an output voltage VO2 generated by the transconductance amplifier GM2 is provided as a calibrated reference voltage VREF' generated by the DC calibration circuit 106.

The comparison circuit 102 is electrically coupled to the DC calibration circuit 106 and the feedback circuit 105 to respectively receive the calibrated reference voltage VREF' and the feedback signal VFB. The comparison circuit 102 compares the calibrated reference voltage VREF' with the feedback signal VFB and generates a comparison signal SET. In an embodiment, the comparison circuit 102 comprises a comparator CMP having a non-inverting input terminal, an inverting input terminal and an output terminal. The non-inverting input terminal is configured to receive the calibrated reference voltage VREF', the inverting input terminal is electrically coupled to the feedback circuit 105 to receive the feedback signal VFB. The comparator CMP compares the calibrated reference voltage VREF' with the feedback signal VFB and generates the comparison signal SET at the output terminal.

The on-time control circuit 101 generates an on-time control signal CO to control the on time of the switch M1. In an embodiment, the on-time of the switch M1 is a constant value. In another embodiment, the on-time of the switch M1 varies with the input voltage VIN and/or the output voltage VOUT.

The logic circuit 103 is electrically coupled the on-time control circuit 101 and the comparison circuit 102 to respectively receive the on-time control signal CO and the comparison signal SET. The logic circuit 103 generates control signals based on the on-time control signal CO and the comparison signal SET to control the switches M1 and M2. In an embodiment, the logic circuit 103 comprises a RS trigger. The RS trigger has a set terminal S, a reset terminal R and output terminals Q and Q', wherein the set terminal S is electrically coupled to the output terminal of the comparison circuit 102 to receive the comparison signal SET, and the reset terminal R is electrically coupled to the on-time control circuit 101 to receive the on-time control signal CO. Based on the comparison signal SET and the on-time control signal CO, the RS trigger generates control signals at the output terminals Q and Q' to respectively control the switches M1 and M2.

In an embodiment, the control circuit may further comprise a minimum off time control circuit. The minimum off time control circuit provides a minimum off time signal to the logic circuit 103 to ensure a minimum off time of the switch M1.

Figure 2:
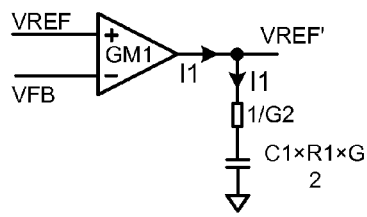
FIG. 2 illustrates a small signal equivalent circuit 106' of the DC calibration circuit 106 shown in FIG. 1.

By applying small signal analysis, the DC calibration circuit 106 of FIG. 1 may be simplified into a small signal equivalent circuit 106' as shown in FIG. 2. The transconductance amplifier GM2, the resistor R1 and the capacitor C1 are equivalent to a resistor with a resistance of 1/G2 and a capacitor with a capacitance of C1×R1×G2 which are connected in series, wherein G2 is the gain of the transconductance amplifier GM2.

Therefore, through the transconductance amplifier GM2 and the resistor R1, the equivalent capacitance of the capacitor C1 is magnified by R1×G2 times. For example, when R1=500 Kohm, G2=0.2 ms, C1=30 pF, the equivalent capacitance of the capacitor C1 is magnified by 100 times and is 3 nF. Thus, with the DC calibration circuit 106 shown in FIG. 1, the DC calibration can be achieved by a capacitor having smaller capacitance, and such a capacitor may be easily fabricated in an integrated circuit.

Figure 3:
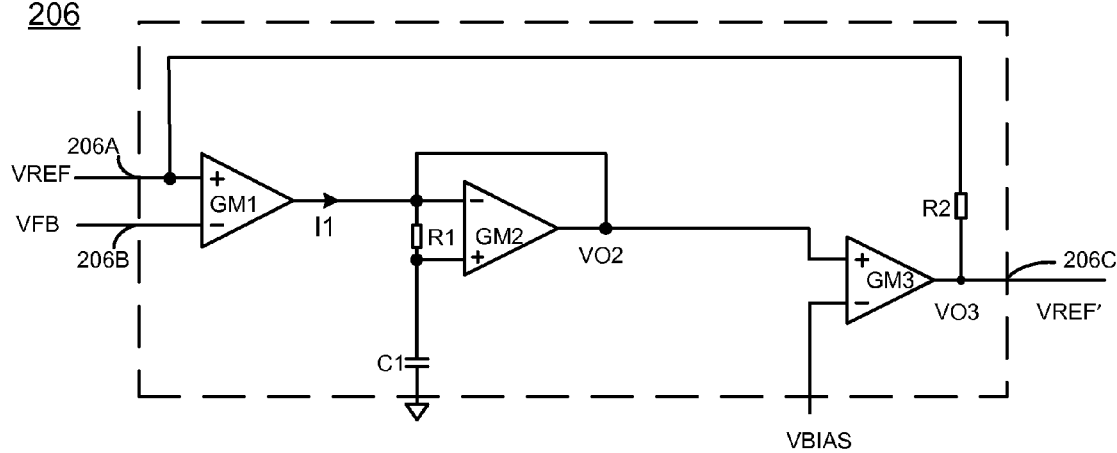
FIG. 3 illustrates a DC calibration circuit 206 in accordance with another embodiment of the present invention.

FIG. 3 illustrates a DC calibration circuit 206 in accordance with another embodiment of the present invention. As shown in FIG. 3, the DC calibration circuit 206 comprises a first input terminal 206A, a second input terminal 206B and an output terminal 206C. Compared with the DC calibration circuit 106 illustrated in FIG. 1, the DC calibration circuit 206 further comprises a transconductance amplifier GM3 and a resistor R2. The transconductance amplifier GM3 has a non-inverting input terminal, an inverting input terminal and an output terminal, wherein the non-inverting input terminal is coupled to the output terminal of the transconductance amplifier GM2 to receive the output voltage VO2, the inverting input terminal is configured to receive a bias voltage VBIAS, and the output terminal is electrically coupled to the output terminal 206C of the DC calibration circuit 206. The resistor R2 is electrically coupled between the output terminal of the transconductance amplifier GM3 and the non-inverting input terminal of the transconductance amplifier GM1. The transconductance amplifier GM3 generates an output voltage VO3 at its output terminal based on the output voltage VO2 of the transconductance amplifier GM2 and the bias voltage VBIAS. In the embodiment illustrated in FIG. 3, the output voltage VO3 of the transconductance amplifier GM3 is provided as a calibrated reference voltage VREF' of the DC calibration circuit 206.

Figure 4:
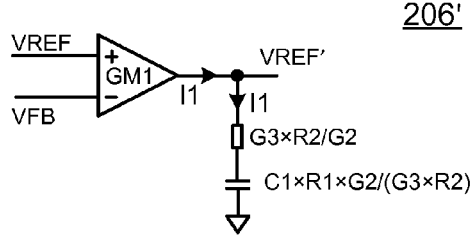
FIG. 4 illustrates a small signal equivalent circuit 206' of the DC calibration circuit 206 shown in FIG. 3.

Under small signal analysis, when VBIAS=VREF/(R2×G3), the DC calibration circuit 206 illustrated in FIG. 3 may be simplified into a small signal equivalent circuit 206' illustrated in FIG. 4. As shown in FIG. 4, the transconductance amplifiers GM2 and GM3, the resistors R1 and R2 and the capacitor C1 are equivalent to an equivalent resistor with a resistance of G3×R2/G2 and an equivalent capacitor with a capacitance of C1×R1×G2/(G3×R2), wherein G3 represents the gain of the transconductance amplifier GM3.

Thus, through the transconductance amplifiers GM2 and GM3 and the resistors R1 and R2, the equivalent capacitance of the capacitor C1 is magnified by R1×G2/(G3'R2) times.

For example, when R1=500 Kohm, G2=0.2 ms, C1=30 pF, R2=50 ohm, G3=0.2 ms, the equivalent capacitance of the capacitor C1 is magnified by 10000 times and is 300 nF. Thus, with the DC calibration circuit 206 shown in FIG. 3, the DC calibration can be achieved by a capacitor having smaller capacitance, and such a capacitor may be easily fabricated in an integrated circuit.

Besides, the use of the transconductance amplifier GM3 and the resistor R2 may reduce the fluctuation of the output voltage VO2 of the transconductance amplifier GM2.

Figure 5:
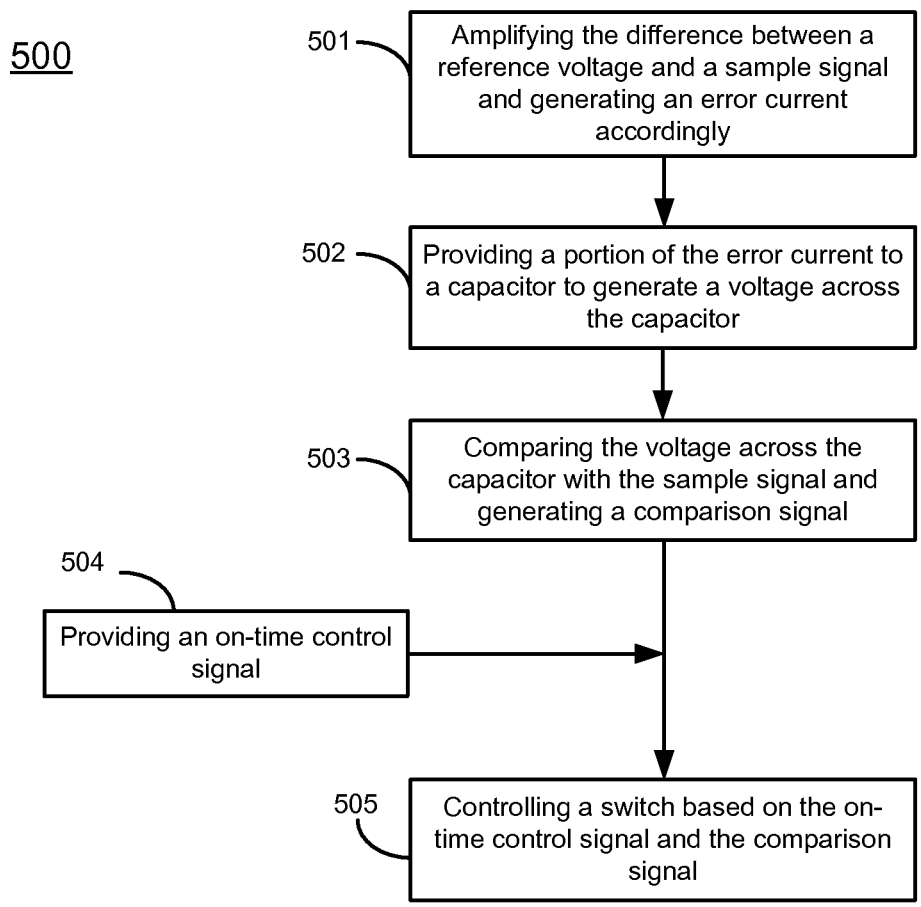
FIG. 5 illustrates a control method 500 for controlling a switching converter in accordance with an embodiment of the present invention.

FIG. 5 illustrates a control method 500 for controlling a switching converter in accordance with an embodiment of the present invention. The switching converter comprises a switch and is configured to provide an output voltage. As shown in FIG. 5, the control method 500 comprises steps 501-505. In step 501, the difference between a reference voltage and a sample signal representative of the output voltage is amplified to generate an error current. The sample signal may be the output voltage of the switching converter, or a feedback signal indicative of the output voltage. In step 502, a portion of the error current is provided to a capacitor to generate a voltage across the capacitor. In step 503, the voltage across the capacitor is compared with the sample signal and a comparison signal is generated accordingly. In step 504, an on-time control signal is provided to control an on time of the switch. In step 505, a control signal is generated based on the on-time control signal and the comparison signal, so as to control the switch.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A control circuit of a switching converter, wherein the switching converter comprises a switching circuit providing an output voltage, the control circuit comprises:

a DC calibration circuit having a first input terminal, a second input terminal and an output terminal, wherein the first input terminal and the second input terminal are configured to respectively receive a reference voltage and a sample signal representative of the output voltage, and wherein the DC calibration circuit generates a calibrated reference voltage at the output terminal based on the reference voltage and the sample signal, and wherein the DC calibration circuit further comprises:

a first amplifier having a first input terminal, a second input terminal and an output terminal, wherein the first input terminal and the second input terminal are configured to respectively receive the reference voltage and the sample signal, and the first amplifier amplifies the difference between the reference voltage and the sample signal and generates an error current at the output terminal;

a second amplifier having a first input terminal, a second input terminal and an output terminal, wherein the first input terminal is electrically coupled to the output terminal of the first amplifier to receive the error current, and the output terminal is electrically coupled to the first input terminal of the second amplifier and the output terminal of the DC calibration circuit;

a first resistor electrically coupled between the first input terminal and the second input terminal of the second amplifier;

a capacitor electrically coupled between the second input terminal of the second amplifier and a reference ground;

a third amplifier having a first input terminal, a second input terminal and an output terminal, wherein the first input terminal of the third amplifier is electrically coupled to the output terminal of the second amplifier, the second input terminal of the third amplifier is configured to receive a bias voltage, and the output terminal of the third amplifier is electrically coupled to the output terminal of the DC calibration circuit; and a second resistor electrically coupled between the output terminal of the third amplifier and the first input terminal of the first amplifier;

a comparison circuit electrically coupled to the DC calibration circuit, wherein the comparison circuit compares the sample signal with the calibrated reference voltage and generates a comparison signal;

an on-time control circuit configured to generate an on-time control signal; and a logic circuit electrically coupled to the comparison circuit and the on-time control circuit, wherein based on the on-time control signal and the comparison signal, the logic circuit generates a control signal to control the switching circuit.

2. The control circuit of claim 1, wherein the first amplifier, the second amplifier or the third amplifier comprises a transconductance amplifier.

3. The control circuit of claim 1, wherein the comparison circuit comprises a comparator having a first input terminal, a second input terminal and an output terminal, wherein the first input terminal is configured to receive the sample signal, the second input terminal is electrically coupled to the output terminal of the DC calibration circuit to receive the calibrated reference voltage, and wherein the comparator compares the sample signal with the calibrated reference voltage and generates the comparison signal at the output terminal.

4. A switching converter, comprising:

a DC calibration circuit having a first input terminal, a second input terminal and an output terminal, wherein the first input terminal and the second input terminal are configured to respectively receive a reference voltage and a sample signal representative of the output voltage, and wherein the DC calibration circuit generates a calibrated reference voltage at the output terminal based on the reference voltage and the sample signal, and wherein the DC calibration circuit further comprises:

a first amplifier having a first input terminal, a second input terminal and an output terminal, wherein the first input terminal and the second input terminal are configured to respectively receive the reference voltage and the sample signal, and the first amplifier amplifies the difference between the reference voltage and the sample signal and generates an error current at the output terminal;

a second amplifier having a first input terminal, a second input terminal and an output terminal, wherein the first input terminal is electrically coupled to the output terminal of the first amplifier to receive the error current, and the output terminal is electrically coupled to the first input terminal of the second amplifier and the output terminal of the DC calibration circuit;

a first resistor electrically coupled between the first input terminal and the second input terminal of the second amplifier;

a capacitor electrically coupled between the second input terminal of the second amplifier and a reference ground;

a third amplifier having a first input terminal, a second input terminal and an output terminal, wherein the first input terminal of the third amplifier is electrically coupled to the output terminal of the second amplifier, the second input terminal of the third amplifier is configured to receive a bias voltage, and the output terminal of the third amplifier is electrically coupled to the output terminal of the DC calibration circuit; and a second resistor electrically coupled between the output terminal of the third amplifier and the first input terminal of the first amplifier;

a comparison circuit electrically coupled to the DC calibration circuit, wherein the comparison circuit compares the sample signal with the calibrated reference voltage and generates a comparison signal;

an on-time control circuit configured to generate an on-time control signal;

a logic circuit electrically coupled to the comparison circuit and the on-time control circuit, wherein based on the on-time control signal and the comparison signal, the logic circuit generates a control signal; and a switching circuit configured to receive an input voltage and the control signal, wherein the switching circuit converts the input voltage into an output voltage based on the control signal.

5. The switching converter of claim 4, wherein the first amplifier, the second amplifier or the third amplifier comprises a transconductance amplifier.

6. The switching converter of claim 4, wherein the comparison circuit comprises a comparator having a first input terminal, a second input terminal and an output terminal, wherein the first input terminal is configured to receive the sample signal, the second input terminal is electrically coupled to the output terminal of the DC calibration circuit to receive the calibrated reference voltage, and wherein the comparator compares the sample signal with the calibrated reference voltage and generates the comparison signal at the output terminal.

* * * * *